2,969,356
PREPARATION OF SULFURIC ACID ESTERS OF CELLULOSE

George P. Touey and John E. Kiefer, Kingsport, Tenn., assignors to Eastman Kodak Company, Rochester, N.Y., a corporation of New Jersey No Drawing. Filed May 15, 1958, Ser. No. 735,384

7 Claims. (Cl. 260—215)

This invention relates to the preparation of sulfuric acid esters of cellulose and more particularly to a method of preparing substantially undegraded water-soluble cellulose sulfate by reacting upon cellulose with a relatively small proportion of sulfating agent in solution in lower fatty acid and anhydride.

Water-soluble cellulose sulfate has previously been prepared by reacting cellulose with sulfuric acid and a low-molecular-weight alcohol or the sulfate of a low-molecular-weight alcohol as disclosed in U.S. Patents Nos. 2,559,914, 2,675,377, and 2,539,451. The preparation of sulfuric acid esters of cellulose by using a large excess of sulfuric acid in the presence of acetic acid and an inert diluent has been disclosed in U.S. Patent No. 2,714,591.

U.S. Patent No. 2,582,009 describes the preparation of cellulose acetate sulfates in which sulfuric acid and acetic anhydride usually with acetic acid is employed in the esterification operation. The proportion of acetic anhydride to cellulose, however, is large and the product obtained is essentially a triester of cellulose having a considerable acetyl content.

An object of our invention is to provide a procedure for preparing a substantially undegraded water-soluble cellulose sulfate. Another object of our invention is to provide a method for preparing water-soluble cellulose sulfate without the use of excess sulfuric acid. A further object of our invention is to provide a fibrous method for preparing a water-soluble cellulose sulfate which may be easily separated from the sulfating liquor at the end of the reaction. A still further object of our invention is to provide a method for preparing a water-soluble cellulose sulfate which contains a minor proportion of combined acyl and is free of odor upon storage. Other objects of our invention will appear herein.

We have found that cellulose sulfates can be conveniently prepared by a procedure free of some difficulties which have been met with in the procedures which have been used heretofore. Cellulose which has been activated is reacted upon by sulfuric acid or $SO_3$ containing sulfuric acid in solution in a mixture of a fatty acid which will not solidify at the temperatures used and lower molecular weight fatty acid anhydride in slight excess of that which is necessary to react with the water present in the system and that produced in the esterification reaction. The sulfation reaction in accordance with our invention is carried out by mixing at 0–15° C., one part of activated cellulose with 0.2–1.0 part of sulfating agent (either sulfuric acid or sulfuric acid containing up to 65% $SO_3$) in solution in 5–15 parts of fatty acid of 3–4 carbon atoms such as propionic, butyric, or isobutyric acid and 0.3–2 parts of lower fatty acid anhydride. When the cellulose reaches the desired degree of sulfation, 90–100% of the sulfating agent present in the mass has reacted with the cellulose; hence, no recovery of sulfuric acid from the spent esterification mixture is required. The fibrous product is readily separated from the liquid which has been employed in its preparation.

The lower fatty acid anhydride employed is the anhydride of any low molecular aliphatic acid of 2–5 carbon atoms. If cost is considered, acetic anhydride is preferable. The acid anhydride keeps the system anhydrous, hence, a slight excess over that required to react with any water present in the system such as supplied in the cellulose and the water produced as a by-product in the sulfation operation, is used. When the sulfating agent is a mixture of sulfuric acid and $SO_3$, 0.3–1 part of acetic anhydride per part of cellulose is used. With a higher anhydride, a slightly higher ratio of anhydride to cellulose is desirable. If the sulfating acid is sulfuric acid with no substantial $SO_3$ content, then 0.5–1.5 parts of acetic anhydride (or slightly more if a higher anhydride) per part of cellulose is preferable.

The cellulose employed as the starting material in a process in accordance with our invention may be cotton linters, high alpha cellulose wood pulp, powdered cellulose or any other commercial grade cellulose. Initially, the cellulose is desirably activated or converted to a swollen condition by one of the procedures commonly employed in the art for this purpose. One method of activation which has been found to be useful is that which consists of steeping the cellulose in aqueous 10% NaOH, washing in water, and replacing the water with an aliphatic acid corresponding to that employed in the sulfation. Another activating procedure which may be used involves swelling of the cellulose with water and removal of the water with fatty acid. Any compatible treatment which converts the cellulose to a swollen, readily accessible condition may be employed.

The following examples describe methods of preparing cellulose sulfate in accordance with our invention.

Example 1

100 parts of powdered wood pulp was activated by soaking it for 2 hours at room temperature in a 10% solution of sodium hydroxide followed by filtering off the sodium hydroxide, washing with water and dewatering with propionic acid. The activated cellulose was slurried in 700 parts of propionic acid. The slurry was cooled to 0° C., a mixture consisting of 30 parts of 65% fuming sulfuric acid and 100 parts of propionic acid, cooled to 0° C., was added and the mass was thoroughly mixed at 0° C. for 30 minutes. 75 parts of acetic anhydride were then slowly mixed in over a period of 30 minutes. After a small sample of the cellulose sulfate was found to be water soluble, 30 parts of solid sodium acetate were added and the temperature was adjusted to 25° C. The mass was mixed for 30 minutes at 25° C., the liquid was then drained off and the sodium cellulose sulfate thus obtained was washed with methyl alcohol and dried. The powder thus obtained contained 7.1% sulfur, 7.7% propionyl and 2.2% acetyl. It was readily soluble in water to give a smooth, viscous dope. The dope thus obtained when poured onto a glass plate and the water evaporated therefrom gives a film which is transparent, strong, and flexible. The product is odorless even after keeping under closed conditions for 2 months at 40° C.

Example 2

100 parts of powdered wood pulp was soaked for 2 hours in 10% aqueous sodium hydroxide at 25° C., following which the pulp was filtered, washed with water, and dewatered with propionic acid. The thus activated pulp was slurried in 700 parts of propionic acid and after cooling to 0° C. was mixed with a mixture of 50 parts of 65% fuming sulfuric acid and 100 parts of propionic acid which had been cooled to 0° C. After mixing for 15 minutes at 0° C. there was slowly added over a period of 30 minutes, 100 parts of propionic anhydride. The sulfating liquid was then drained off and the cellulose acid sulfate obtained was converted to the sodium salt by slurrying it in 100 parts of propionic acid having therein 50 parts of sodium acetate. The sodium salt thus obtained was washed with methyl alcohol and dried. It contained 9.7% sulfur and 13.2% propionyl. Some of the cellulose sodium sulfate thus prepared was dissolved in water at 5% concentration to form a smooth, viscous dope which could be cast into a strong flexible film. The sodium cellulose sulfate prepared by this procedure developed no acid odor even though stored for 2 months in a closed bottle at 40° C.

*Example 3*

100 parts of cotton linters were soaked in 10% aqueous sodium hydroxide for 2 hours at 25° C. The linters thus activated were filtered, washed in water, and dewatered with isobutyric acid. The cellulose was then slurried in 700 parts of isobutyric acid and the slurry was cooled to 0° C. This cellulose slurry was mixed with a mixture of 40 parts of 98% strength sulfuric acid and 100 parts of isobutyric acid which had been cooled to 0° C. After mixing at 0° C. for 30 minutes, 100 parts of acetic anhydride was added over a period of 30 minutes. 40 parts of sodium acetate was added and the temperature was raised to 25° C. Mixing for 30 minutes gave sodium cellulose sulfate which was separated from the sulfating solution, washed with methyl alcohol, and dried. The dry powder obtained contained 8.2% sulfur, 7.1% isobutyryl and 1.0% acetyl. A 5% solution in water was a smooth, very viscous dope which could be cast into a strong flexible film. No acid odor resulted upon storage of the product for 2 months in an enclosed container.

*Example 4*

100 parts of wood pulp in powdered form was activated by soaking in water for 2 hours at 80–90° C. The pulp was filtered and dewatered with propionic acid and was then slurried in 700 parts of propionic acid. The slurry was cooled to 0° C. and a mixture of 80 parts of 65% fuming sulfuric acid and 100 parts of propionic acid having a temperature of 0° C. was thoroughly incorporated into the mass which was mixed at 0° C. for 30 minutes. 75 parts of acetic anhydride was slowly mixed in over a period of 30 minutes. A small sample of the cellulose product was found to be water soluble. 15 parts of sodium hydroxide dissolved in 100 parts of acetic acid was then added to the mass and the temperature was adjusted to 25° C. and the mass was mixed at that temperature for 30 minutes whereupon the liquid was drained off and the sodium cellulose sulfate obtained was washed with methyl alcohol and dried. A sodium cellulose sulfate powder was obtained which was washed with methyl alcohol and dried. The powder thus obtained contained 14% sulfur, 4.4% propionyl, and 1.5% acetyl. It was readily soluble in water to form a viscose dope.

It is a feature of our invention that the sulfation operation is carried out under anhydrous conditions. Hence, a small amount of anhydride is present in the sulfation liquid to consume the water during the reaction. The water present in the cellulose after its activation is removed by means of a wash with a fatty acid of 3–4 carbon atoms such as with propionic acid.

In the making of cellulose sulfates the lower fatty acid anhydride is employed in slight excess over the amount which is required to remove all the water which is formed by the reaction and any slight amount of water which is not removed such as in the dewatering of the cellulose.

The cellulose sulfates obtained in accordance with our invention also contain a small content of lower fatty acid radicals as a result of the reaction. This acyl content, however, is sufficiently small that the product obtained can be stored in dry form for extended periods of time without enough hydrolysis occurring to develop an odor of fatty acid therein.

The sodium cellulose sulfates prepared in accordance with our invention may be employed as detergent additives in the preparation of compositions such as are suitable for the laundering of fabrics or the like. They may be employed as additives to oil well drilling mud or they may be employed for thickening and suspending agents in aqueous systems such as in the preparation of paints which contain water as the vehicle or in cosmetic or pharmaceutical preparations such as liquid cleansing creams, brushless shave creams, hand lotions, dentifrices and the like. The sodium cellulose sulfates prepared as described herein may be employed in other connections such as a stabilizing agent in conjunction with a surface active agent for oil-in-water emulsions or in the forming of oilproof films such as in the manufacture of paper containers for oily or greasy materials. They may be employed in adhesive compositions, particularly compositions to be applied to porous materials such as paper or wood to cause their adherence. These materials may be employed as creaming agents for rubber latices or as binding agents in various compositions such as medicinal capsules, shoe polishes, crayons, abrasive papers, and the like. Various other uses in which the presence of a thickener in an aqueous system is desired will occur to those skilled in the art.

The sulfation reaction in accordance with our invention is carried out at a reaction temperature below 15° C. and preferably below 10° C., temperatures on the order of approximately 0° C. being quite convenient to obtain a substantially undegraded product.

We claim:

1. A method of preparing sulfuric acid esters of cellulose which comprises reacting under anhydrous conditions upon 1 part solid weight of an activated cellulose at 0–15° C. with 0.2–1.0 part of a sulfating agent selected from the group consisting of sulfuric acid and fuming sulfuric acid, fatty acid of 3–4 carbon atoms as the solvent therein and lower fatty acid anhydride within the range of 0.3–2 parts, in slight excess of that sufficient to destroy all the water present in the system and formed during the course of the esterification.

2. A method of preparing a sulfuric acid ester of cellulose which comprises reacting under anhydrous conditions upon 1 part of cellulose which had been activated with aqueous sodium hydroxide, washed with water and dewatered with fatty acid of 3–4 carbon atoms with an esterification mass consisting of 0.2–1.0 part of a sulfuric acid sulfating agent, fatty acid of 3–4 carbon atoms as the solvent medium and lower fatty acid anhydride within the range of 0.3–2 parts in slight excess of that sufficient to destroy all the water present and formed during the esterification procedure.

3. A method for preparing a cellulose sulfate which comprises sulfating under anhydrous conditions 1 part of activated cellulose, which had been activated by treatment with boiling water followed by removal of the water therefrom, at 0–15° C. with an esterification bath of 0.2–1.0 part of sulfating agent, 5–15 parts of fatty acid of 3–4 carbon atoms and lower fatty acid anhydride, in an amount, selected from the range of 0.3–2 parts, in slight excess of that sufficient to destroy all the water present in the mass and formed during the esterification procedure.

4. A method of preparing sulfuric acid esters of cellulose which comprises reacting under anhydrous conditions upon 1 part of activated cellulose at 0–15° C. with a reaction bath essentially consisting of 0.2–1.0 part of a sulfating agent, 5–15 parts of a fatty acid of 3–4 carbon atoms and acetic anhydride, in an amount selected from the range of 0.3–2 parts, in slight excess of that sufficient to destroy all of the moisture present and formed during the esterification reaction, and continuing the reaction for a time sufficient to impart a substantial combined sulfate content to the cellulose.

5. A method of preparing a sulfuric acid ester of cellulose which comprises reacting under anhydrous conditions upon 1 part of cellulose, which had been activated with aqueous sodium hydroxide, with a mixture of 0.2-1.0 part of a sulfuric acid sulfating agent, 5-15 parts of propionic acid and lower fatty acid anhydride in amount, selected from the range of 0.3-2 parts, in slight excess of that sufficient to destroy all the water present in and formed in the mass, the reaction being carried out for a time sufficient to impart a substantial combined sulfate content to the cellulose.

6. A method of preparing sodium cellulose sulfate which comprises reacting under anhydrous conditions upon 100 parts of cellulose, activated by aqueous sodium hydroxide, with a sulfating liquid comprising 30 parts of 65% fuming sulfuric acid, 800 parts of propionic acid and 75 parts of acetic anhydride at 0-15° C. for a sufficient time to impart a substantial combined sulfate content to the cellulose, adding to the mass the sodium salt of a weak organic acid, mixing for a time, then separating the resulting product, removing the esterification liquid therefrom and drying, whereby a product which readily dissolves in water to form a smooth viscous dope is obtained.

7. A method for preparing sulfuric acid esters of cellulose which retain at least 50% of their original hydroxyl groups free and unesterified, which comprises reacting under anhydrous conditions upon 1 part solid weight of an activated cellulose at 0-15° C. with 0.2-1.0 parts of a sulfating agent selected from the group consisting of sulfuric acid and fuming sulfuric acid, fatty acid of 3-4 carbon atoms is the solvent therein and lower fatty acid anhydride within the range of 0.3-2 parts in slight excess of that sufficient to destroy all the water present in the system and formed during the course of the esterification.

References Cited in the file of this patent
UNITED STATES PATENTS

| | | |
|---|---|---|
| 2,582,009 | Crane | Jan. 8, 1952 |
| 2,622,079 | Crane | Dec. 16, 1952 |
| 2,714,591 | Klug | Aug. 2, 1955 |